United States Patent Office 2,711,045
Patented June 21, 1955

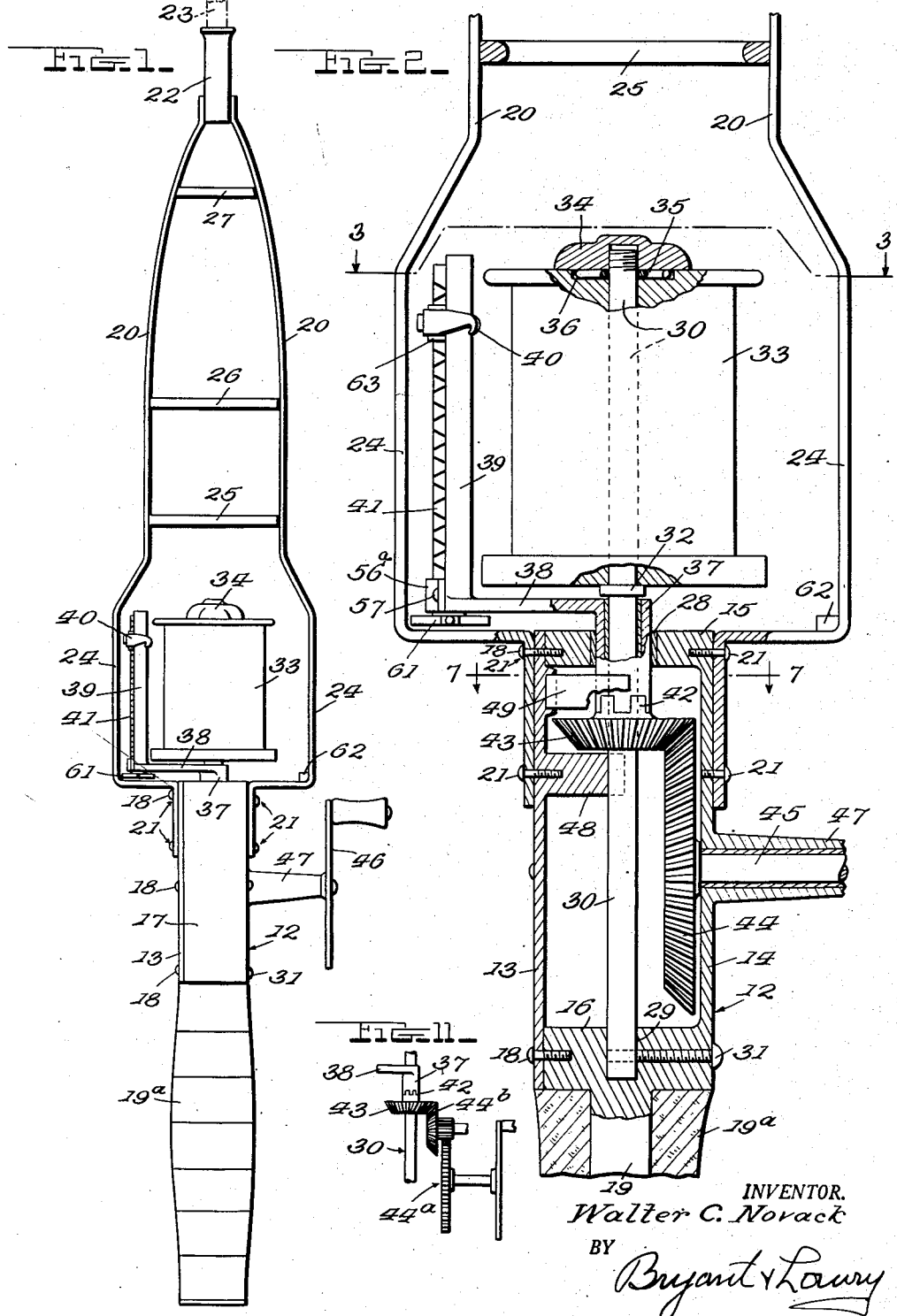

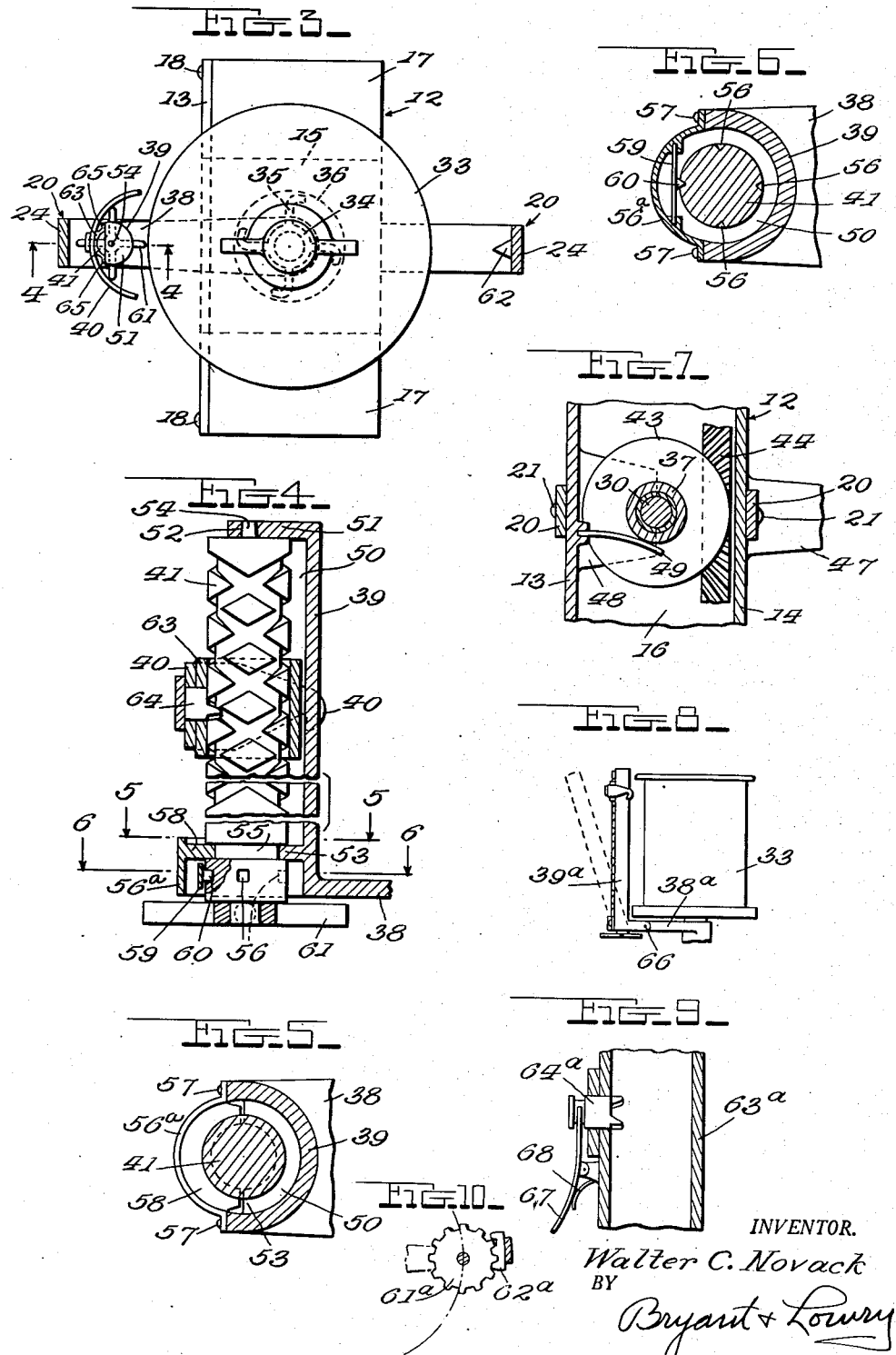

2,711,045

FISHING ROD HANDLE AND REEL ASSEMBLY

Walter C. Novack, Machias, Maine

Application April 3, 1952, Serial No. 280,208

2 Claims. (Cl. 43—20)

This invention relates to a novel assembly of a fishing rod handle and line reel in which the spool of the reel has its axis extending unidirectionally with the rod instead of transverse thereto. The spool is non-rotatable during casting and the line simply whirls around the spool and slips from the front end of said spool, the reel being therefore known as the "slip cast type."

One object of the invention is to provide a simple, light and convenient construction which may be advantageously used for casting lures or bait accurately and for long distances whether the lures or bait be light or heavy. The invention is therefore advantageous for spin-casting, trolling, still-fishing, etc.

Another object of the invention is to provide a construction in which the spool of the reel is non-rotatably mounted and in which the line is wound upon said spool, by means of a flyer which travels around the spool as the reel handle is rotated, said flyer having a line guide with which the line is engaged during reeling-in of the line, and from which the line is disengaged for casting.

Yet another object of the invention is to provide novel means for moving the line guide alternately forwardly and rearwardly during reeling-in of the line to cause uniform distribution of the line convolutions on the spool.

A further object of the invention is to embody, in the line guide operating means, a traversing screw connected with the line guide, and to provide novel means for rotating said screw as the flyer travels around the spool.

A still further object of the invention is to provide a novel connecting structure between the rod and a hand grip, which structure not only effectively mounts the reel including the flyer, and the flyer operating means, but includes line guiding rings which are instrumental in providing a forward grip for one of the caster's hands, thereby aiding in supporting the assembly, particularly when the line is being retrieved.

Still another object of the invention is to provide a novel construction which may be used to equal advantage by either a right-handed or a left-handed person.

With the above and other objects in view that will become apparent as the nature of the invention is better understood, the same consists in the novel form, combination and arrangement of parts hereinafter more fully described, shown in the accompanying drawings, and claimed.

In the drawings:

Figure 1 will be considered as a side elevation of the assembly held vertically, for better correlation with the other views, although this view would of course be a top plan of said assembly held horizontally, Figure 2 is an enlarged fragmentary view similar to a portion of Figure 1 but partly in section, Figure 3 is a transverse sectional view on line 3—3 of Figure 2, Figure 4 is a further enlarged sectional view on line 4—4 of Figure 3, showing the traversing screw and associated portions of the line guide operating means, Figures 5 and 6 are sectional views on lines 5—5 and 6—6 of Figure 4, respectively, Figure 7 is a detail sectional view on line 7—7 of Figure 2, Figure 8 is a detail elevation showing a modification of the flyer, Figure 9 is a detail sectional view showing a modification of a portion of the line guide traversing means, Figure 10 is a fragmentary view showing a modification of the traversing screw operating means, and Figure 11 is a fragmentary elevation showing a modification of the flyer driving means.

The construction shown in Figures 1 to 7, inclusive, is preferred, but may of course be varied within the scope of the invention, and only a few of many possible variations are shown in the other views.

A gear casing 12 is provided having parallel side walls 13 and 14, a front end wall 15, a rear end wall 16, and longitudinal side walls 17. The walls 14, 15, 16, and 17 may be formed as an integral unit but the wall 13 is removably secured by screws 18. A stub 19 is rigidly secured to and projects rearwardly from the rear end wall 16 and carries a suitable hand grip 19ª.

Two laterally spaced metal bars 20 are secured at 21 to opposite sides of the casing 12 and project forwardly from said casing, the front portions of said bars being disposed in forwardly converging relation and being secured to a sleeve 22 which constitutes a socket to receive the rear end of a fishing rod 23. The portions 24 of these bars immediately in advance of the casing 12, are outwardly offset to provide greater intervening space to accommodate the spool and flyer hereinafter described. In advance of the portions 24 of the bars 20, these bars are connected by rings 25, 26, and 27 through which the line extends to the usual guides of the rod 23. The rings 25 and 26 are disposed sufficiently close together to allow these rings and the contiguous portions of the bars 20 to be gripped in one hand, thereby providing a convenient forward grip which is often of advantage, particularly when retrieving the line.

The front end wall 15 of the casing 12 is provided with a bearing 28 and the rear end wall 16 has a socket 29 alined with said bearing. A rigid shaft 30 extends through the bearing 28 but is inwardly spaced from and concentric with said bearing. The rear end of this shaft 30 is secured in the socket 29 by means of a screw 31 and the front portion of said shaft projects forwardly beyond the casing 12 between the offset portions 24 of the bars 20. Somewhat in advance of the casing 12, the shaft 30 is provided with a fixed shoulder 32. A spool 33 is mounted on the front portion of the shaft 30 and the rear end of said spool abuts the shoulder 32. This spool is secured in place my means of a nut 34 and a spring washer 35, said nut being threaded on the front terminal of the shaft and said washer being confined in a recess 36 in the spool. The spool is thus tightly held on the shaft 30 and does not rotate, either during casting or when reeling-in the line.

A sleeve 37 rotatably surrounds the shaft 30 and is rotatably mounted in the bearing 28, said sleeve having a radial arm 38, the outer end of which carries a forwardly projecting finger 39. This finger is disposed at the periphery of the spool 33 and supports a line guide 40 and an endless-thread traversing screw 41 for said guide, as will be hereinafter more fully described. The elements 37, 38, 39, 40, and 41 constitute a flyer which winds the line onto the spool 33 when reeling-in said line, but this flyer is entirely idle when casting.

The rear end of the sleeve 37 has a toothed connection 42 with a bevel pinion 43 which is rotatable upon the shaft 30. This pinion meshes with a bevel gear 44 on a shaft 45 having a hand-crank 46, the casing wall 14 being provided with a bearing 47 for said shaft. Thus, rotation of the crank 46 will rotate the flyer about the spool 33.

Immediately behind the pinion 43, the removable casing wall 13 is provided with a half bearing 48 for steadying the shaft 30; and in front of said pinion 43, said casing wall carries a friction drag spring 49 for the sleeve 37. This sleeve is held against forward movement by the shoulder 32 and against rearward movement by the pinion 43 and bearing 48.

The finger 39 of the flyer is of longitudinally channeled form with its channel 50 disposed outwardly away from the spool 33. The front end of this channel is closed by an end wall 51 while the rear end of said channel is open. The end wall 51 has a bearing 52, and near the rear end of the channel 50 there is a half bearing 53 formed on the finger 39. The traversing screw 41 is received in the channel 50 and has a bearing stud 54 at its front end received in the bearing 52. Near its rear end, this screw 41 is formed with a peripheral groove 55 into which the half bearing 53 extends. Between this groove 55 and its rear end the screw 41 has circumferentially spaced sockets 56.

A curved strap 56ª spans the open side of the channel 50 at the rear end of the finger 39 and is secured to said finger by screws 57. This strap is provided with a half bearing 58 received in the groove 55 and cooperating with the half bearing 53 in mounting the rear end of the screw 41 and holding the latter against endwise movement. The strap 56ª also carries a leaf spring 59 having a detent 60 cooperable successively with the sockets 56 as the screw 41 is turned. This turning occurs step-by-step as the flyer rotates. To accomplish this screw turning, a "star wheel" 61 is secured to the rear end of the screw 41 and a cooperating lug 62 is secured to one of the bars 20. Each time the star wheel engages and passes the lug 62, the screw 41 is turned the distance between two of the sockets 56. At the start of this movement, the detent 60 is forced from one of the sockets 56 and at the end of said movement said detent enters the next socket. Thus the star wheel is always properly positioned to engage the lug 62 instead of possibly causing the mechanism to jam.

A sleeve 63 slidably surrounds the screw 41 and carries the line guide 40, said sleeve having a pivotally mounted shoe 64 which is permanently engaged with the endless thread of the screw. The sleeve 63 may have ribs 65 (Figure 3) slidably engaging the longitudinal edges of the channeled finger 39 to hold said sleeve against turning.

When reeling-in with the line engaged with the guide 40, the flyer 37—38—39 etc., is rotated about the spool 33 by turning the crank 46. The star wheel 61 and lug 62 then rotate the traversing screw 41 step-by-step and this screw causes to and fro movement of the sleeve 63 and line guide 40. Thus the traveler winds the line upon the spool and equally distributes the line convolutions upon said spool.

The line guide 40 is preferably in the form of a double-ended hook with either end of which the line may be engaged. Thus, the assembly may be used one-side-up with the line engaged with one hook, by a right-handed person, and may be used the-other-side-up with the other hook engaged with the line, by a left-handed person.

In casting, the line is free from the guide 40 and simply unwinds from the spool by slipping endwise therefrom. There is thus no drag upon the line to interfere with distant casting, even when using a very light lure. Should a drag on the line be desired to stop the cast at a selected point, this may be supplied by the fisherman simply pressing the line against the spool with his forefinger.

Figure 8 discloses a variation in which the carrying finger 39ª for the traversing screw etc. is pivoted at 66 to the flyer arm 38ª. Thus the finger may swing outwardly and allow the reel to give greater clearance between the finger or flyer and the spool during a cast.

In Figure 9, the screw-engaging shoes 64ª mounted on the sleeve 63ª is retractable by means of a lever 67 but is normally held in operative position by means of a spring acting against said lever.

Figure 10 shows a spur gear 61ª which may be used in place of the star wheel 61, said gear being cooperable with a segmental rack 62ª to effect turning of the traversing screw.

Figure 11 discloses a train of spur gearing 44ª for driving a bevel gear 44ᵇ meshing with the gear 43 of the flyer sleeve 37.

These are a few examples of many variations which may be made without departing from the spirit and scope of the invention as claimed, and it will be understood that any appropriate materials may be employed for the various elements.

I claim:

1. A fishing rod handle and reel assembly including a casing having a rearwardly projecting hand grip, a hollow housing extending forwardly from said casing, a socket attached to the outer end of said housing for receiving a rod, a spool mounted in said housing immediately in advance of said casing, said spool being non-rotatably held and having its axis disposed longitudinally of said housing, a flyer mounted for rotation in said housing about said spool and including a line-guide portion, drive means in said casing operatively connected with said flyer, an operating crank connected with said drive means, said flyer further including a traversing screw operatively connected with said line-guide portion for reciprocating said line guide portion parallel with the spool axis, means on the end of said traversing screw for rotating said screw, and means on said housing operatively connected with said rotating means for rotating said traversing screw whereby said line-guide portion is reciprocated as said flyer rotates about said spool.

2. A fishing rod handle and reel assembly including a casing having a rearwardly projecting hand grip, a hollow housing extending forwardly from said casing, a socket attached to the outer end of said housing for receiving a rod, a spool mounted in said housing immediately in advance of said casing, said spool being non-rotatably held and having its axis disposed longitudinally of said housing, a flyer mounted for rotation in said housing about said spool and including a line-guide portion, drive means in said casing operatively connected with said flyer, an operating crank connected with said drive means, said flyer further including a traversing screw operatively connected with said line-guide portion for reciprocating said line-guide portion, a wheel on the end of said traversing screw, and a fixed member in the path of said wheel for engagement by said wheel to intermittently effect turning of said traversing screw whereby said line-guide portion is reciprocated as said flyer is rotated.

References Cited in the file of this patent

UNITED STATES PATENTS

| | | |
|---|---|---|
| 2,144,635 | Norton | Jan. 24, 1939 |
| 2,185,309 | Pierce | Jan. 2, 1940 |
| 2,305,045 | Torrence | Dec. 15, 1942 |
| 2,334,646 | Price | Nov. 16, 1943 |
| 2,428,324 | Worden | Sept. 30, 1947 |
| 2,451,862 | Nelson | Oct. 19, 1948 |
| 2,597,318 | Haase | May 20, 1952 |
| 2,613,468 | Hand | Oct. 14, 1952 |

FOREIGN PATENTS

| | | |
|---|---|---|
| 409,833 | Great Britain | 1934 |
| 807,446 | Germany | 1951 |